United States Patent
Umezawa et al.

(10) Patent No.: US 6,780,283 B2
(45) Date of Patent: Aug. 24, 2004

(54) WET FRICTION MATERIAL AND MANUFACTURING METHOD THEREFOR

(75) Inventors: Shigeki Umezawa, Shizuoka (JP); Keisuke Torii, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/316,020

(22) Filed: Dec. 11, 2002

(65) Prior Publication Data

US 2003/0118830 A1 Jun. 26, 2003

Related U.S. Application Data

(62) Division of application No. 08/581,253, filed on Dec. 29, 1995, now Pat. No. 6,544,632, which is a continuation of application No. PCT/JP95/01737, filed on Aug. 31, 1995.

(30) Foreign Application Priority Data

May 23, 1995 (JP) .......................................... P. 7-146872
Aug. 30, 1995 (JP) .......................................... P. 7-222187

(51) Int. Cl.⁷ .............................................. D21H 23/22
(52) U.S. Cl. ...................... 162/136; 427/345; 427/350; 523/149
(58) Field of Search ...................... 162/136; 523/149; 427/345, 350

(56) References Cited

U.S. PATENT DOCUMENTS

| | | | |
|---|---|---|---|
| 3,103,860 A | * | 9/1963 | Piquette .................... 427/350 |
| 4,520,048 A | * | 5/1985 | Ranger ....................... 427/350 |
| 5,127,949 A | | 7/1992 | Nakazawa et al. |
| 5,486,381 A | * | 1/1996 | Cleveland et al. .......... 427/294 |
| 6,605,128 B2 | * | 8/2003 | Larson et al. ................. 51/298 |

FOREIGN PATENT DOCUMENTS

| | | |
|---|---|---|
| EP | 0231098 A | 8/1987 |
| GB | 191088 A | 1/1923 |
| GB | 191089 A | 1/1923 |
| GB | 412229 A | 6/1934 |
| JP | 45-33326 A | 10/1970 |
| JP | 57-1838 A | 1/1982 |
| JP | 58-189232 A | 11/1983 |
| JP | 62-149629 A | 9/1987 |
| JP | 1-269735 A | 10/1989 |
| JP | 2-3049 A | 1/1990 |
| JP | 2-39655 A | 9/1990 |
| JP | 5-99297 A | 4/1993 |
| JP | 6-173983 A | 6/1994 |
| JP | 6-229434 A | 8/1994 |
| JP | 6-240013 A | 8/1994 |

* cited by examiner

Primary Examiner—Peter Chin
(74) Attorney, Agent, or Firm—Sughrue Mion, PLLC

(57) ABSTRACT

In a wet friction material and a method therefor of the present invention, an excessive binder coating on the outermost surface layer of the friction material is removed or prevented while at least one of impregnation, drying and setting of a binder, and further the surface of the friction material is smoothed by means of heating, pressurizing and molding.

26 Claims, 13 Drawing Sheets

○:NON SHUDDER  x:OCCURRED SHUDDER (MIDIUM)  xx:OCCURRED SHUDDER (HEAVY)  ****:UNMEASURABLE

FIG. 31

| tp 90% \ SURFACE PRESSURE | 1.5 | 5 | 7.5 | 10 | 15 | 20 |
|---|---|---|---|---|---|---|
| 10 | ○ | ○ | ○ | ○ | ○ | ○ |
| 12 | ○ | ○ | ○ | ○ | ○ | ○ |
| 14 | ○ | ○ | ○ | ○ | ○ | ○ |
| 16 | ○ | ○ | ○ | ○ | ○ | × |
| 18 | ○ | ○ | ○ | ○ | ○ | × |
| 20 | ○ | ○ | ○ | × | × | ×× |

FIG. 32

| Ho (60-5) \ SURFACE PRESSURE | 1.5 | 5 | 7.5 | 10 | 15 | 20 |
|---|---|---|---|---|---|---|
| 4 | ○ | ○ | ○ | ○ | ○ | ○ |
| 6 | ○ | ○ | ○ | ○ | ○ | ○ |
| 8 | ○ | ○ | ○ | ○ | ○ | × |
| 10 | ○ | ○ | ○ | ○ | × | × |
| 15 | ○ | ○ | ○ | ×× | ×× | **** |
| 20 | ○ | ○ | ×× | ×× | **** | **** |

WET FRICTION MATERIAL AND MANUFACTURING METHOD THEREFOR

This is a divisional of application Ser. No. 08/581,253 filed Dec. 29, 1995 now U.S. Pat. No. 6,544,632, which is a Continuation Application of PCT Application No. PCT/JP95/01737 filed Aug. 31, 1995; the above noted prior applications are all hereby incorporated by reference.

BACKGROUND OF THE INVENTION

1. Field of the Invention

The present invention relates to a wet friction material used for a clutch, a brake and the like in a friction engaging apparatus, and a manufacturing method therefor.

2. Description of the Related Art

FIG. 19 shows one example of the basic construction of a wet friction clutch. Torque is transmitted when drive plates 2 fitted into a spline 51 of a hub 5 fitted around an input shaft 6 comes into contact with driven plates 1 fitted into a spline 41 of a retainer 4. In this drawing, reference numeral 3 designates a pressure plate, and 7 is a pressure piston.

FIG. 16 is a perspective view showing the driven plates and the drive plates, and FIG. 17 is a side cross-sectional view showing the driven plates and the drive plates in combination. The driven plate 1 is made up of a steel plate portion 11 and a spline projection 12, whereas the drive plate 2 is made up of a steel plate portion 21, a spline projection 22, and a wet friction material 23 bonded to both sides of the steel plate portion 21.

FIG. 18 is a plan view of the drive plate 2, and a groove 24 which also acts as an oil reservoir is formed in the friction plate 23 bonded to the surface of the steel plate portion 21.

In view of the current energy and environmental issues, there is a demand for a compact and light-weight friction clutch which reduces operating shock and removes self-induced oscillation such as occurred shudder so as to provide good ride comfort as well as having a large torque capacity. The friction clutch is also required to cope with high energy resulting from increased rotational speed and output of an automobile engine. Thus, the demand is extremely great.

A conventional friction clutch employs many sophisticated controls in order to reduce fuel consumption and operating shock by increasing a continuous sliding state of a clutch during driving of a car, changing a duty efficiency, and controlling an engine so as to reduce the ratio of an input torque to a clutch capacity when a clutch is engaged.

The wet friction material comprises a fibrous base material such as natural pulp fiber and organic synthetic fiber, a filler such as diatomaceous earth, a friction adjustment agent such as cashew resin and a binder such as thermosetting resin. Conventionally, the binder contained in the inside of the friction material forms a high-concentration impregnated layer (a solid binder layer) on the front and rear layers (i.e., both sides) of the friction material.

The thermosetting resin, which is one example of binder, is commonly used as material which forms a wet friction material (composite fibrous paper). The resin of this type comprises phenol resin, epoxy resin, urea resin, melamine resin, silicon resin, or the like. A wet friction material produced by a paper-making method is widely known as the wet friction material. This friction material is manufactured by mixing a fibrous base material such as natural pulp fiber or organic synthetic fiber as fibrous base material with an agent for controlling friction, producing raw paper, and impregnating the raw paper with a diluted thermosetting resin solution, and evaporating the diluted solution in a drying process, and heating the paper to set the thermosetting resin.

The processes from the process of impregnating raw paper with binder to the drying process will be further explained. When the raw paper is impregnated with binder, the binder is diluted with an organic solvent to a predetermined concentration. After the raw paper is sufficiently impregnated with the diluted binder, the organic solvent is evaporated in a drying process. However, the binder is captured by surface tension, whereby an excess binder coating and a high-concentration binder layer are formed along the outermost layer (about 100 μm) of the friction material surface. It has been impossible to prevent the high-concentration binder layer from being formed along the outermost layers of the front surface (a front layer) and the rear surface (a rear layer). The rear surface and the rear layer are the side of the friction material which is not bonded to the friction surface but bonded to the steel plate. The binder is thermally set in the thermosetting process, as a result of which the binder coating and the high-concentration binder layer formed along the friction material surface are fixed.

It is found that the influence of the excess binder coating and the high-concentration binder layer formed along the outermost layer of the surface by the physical properties (surface tension) of the binder brings about the following problems:

(1) When in an initial state, the binder coating formed over the fibrous base material of the outermost layer is hard and less flexible and forms minute projections. Hence, the binder coating is not necessarily smooth, and only the projections of the binder coating form a sliding surface in view of a macroscopic point when the friction material is in contact with the driven plate (a corresponding sliding surface). For this reason, since a small contact area between the driven plate and the binder, and small original coefficients of friction of the binder, the driven plate result in a small coefficient of friction in the initial state. The binder wears out through the repetition of sliding action, as a result of which a soft fibrous base material is uncovered. This increases the contact area and makes the sliding surface smooth, thereby resulting in an initial running-in state in which the thus uncovered fibrous base material having a large coefficient of friction increases the coefficient of friction between the binder and the driven plate.

(2) The surface of the friction material has a high concentration of binder and lacks flexibility and smoothness, and hence contact between the friction material and the driven plate becomes uneven, thereby bringing about a microscopic wedge effect of an oil film. This wedge effect causes increased operation shock and shudder occurs.

(3) Since the surface of the friction material has a high concentration of binder, the friction material is prone to turn into plastic as a result of a sharp increase in temperature.

Through this running-in process, a torque capacity of the friction material changes from its value which is originally set when the friction value was new during a very short period of time. For this reason, the running in process is considered as a significant quality problem.

FIG. 8 is an explanatory view schematically showing the construction of a surface area of a conventional friction material, and FIG. 9 is a surface contour line R showing the enlarged surface of the friction material. In these drawings, A is a binder (resin) part, B is a fiber part, and C is a filler. As can be seen from the drawings, the surface contour line R is not smooth (this conventional example is designated by $L_2$).

As one example, FIG. 5 shows the distribution of binder $L_2$ in a thicknesswise direction inside of a common friction material after it has set. In view of a product, the problem is that if the capacity of a clutch is designed based on a small friction coefficient of new friction material, a torque capacity increases as the friction coefficient varies in time sequence as a result of a running-in process, thereby bringing about operating shock. For an expensive luxury car, an extra learning function might be added for control. With a low friction coefficient of new friction material, the surface temperature of the friction material increases by frictional heating resulting from extension of a slid time under harsh driving environments. This, in turn, promotes the turning of the binder (thermosetting resin) into plastic because many binders are distributed around the surface layer a phenomenon in which the thermosetting resin around the surface of the friction material resets or becomes carbonized by frictional heating, so that a frictional surface becomes a mirror surface). The changing of the binder to plastic brings about a fading phenomenon, which in turn causes a further extreme drop in friction coefficient. In this way, the problem of heat resistance and durability is encountered. An additive contained in lubricant oil is decomposed and separated out by the friction heat. The thus separated additive attaches to the surface of the friction material and a corresponding slide surface, which clogs the surface of the friction material. As a result of this, the friction material fails to offer its original performance, thereby resulting in a similar drop in friction coefficient.

To prevent these problems, an actuating pressure might be increased to reduce a slide time. However, this method also brings about the following problems: namely, a drop in peel life of the friction material due to repetitive compressive-fatigue caused by a high surface pressure, the generation of a heat spot in a corresponding friction surface (the driven plate) resulting from an increase in heat rate per unit time, thermal deformation, an increase in the size of a hydraulic pump for generating a large hydraulic pressure, and a problem of durability and lifetime such as actuating fluid leaks.

Where the amount (concentration) of impregnated binder is increased to improve the peel life and strength of the friction material, several problems arise as follows: a deterioration in frictional properties (operating shock and occurred shudder) caused by the lack of flexibility of the friction material; a deterioration in a running-in process in which the friction coefficient varies by the influence of the binder layer along the surface of the friction material after the friction material has undergone engaging action several times since it was new; and adhesion of an additive to the friction material as a result of shaving of the additive of lubricant oil attaching to a corresponding slide surface by fibers of the surface of the friction material which are fixed by the binder. As previously mentioned, any of these problems are ascribed to the binder coating and the high-concentration binder layer formed along the outermost layer of the friction material when the friction material was new.

To solve these problems, an excessive binder coating formed along the surface layer of the friction material is conventionally removed by sliding the friction material for a predetermined time, or by machining the surface of a new friction material (as disclosed in Unexamined Japanese Patent Publication (kokai) No. Hei-5-99297). However, these attempts resulted in a considerable drop in durability an lifetime due to a drop in strength by cutting fibers as shown in FIG. 10. Some other methods are also employed wherein the surface of the friction material is carbonized by smoothing a heat plate (as disclosed in Unexamined Utility Model Publication (jikkai) No. Sho-62-149629) or the surface is forcibly smoothed. However, the former method induces a drop in life of the friction material because of a drop in strength of the friction material as a result of the carbonization of fibers. On the other hand, the latter method results in a smooth surface of the friction material, but the smoothing of the surface does not lead to the removal of the excessive binder coating. Thus, this method also fails, to provide a fundamental counter-measure against the fading phenomenon and occurred shudder, which in turn adds to product costs.

SUMMARY OF THE INVENTION

It is an object of the present invention to provide a wet friction material being capable of reducing its coefficient of friction without lowering its strength and reducing operation shock.

A wet friction material of the present invention is comprised of a fibrous base material, a filler, a friction adjustment agent and a binder; wherein a ratio A/B is in the range of 0.85 to 1.15 where A is a binder concentration from a surface of the wet friction material to a depth of 10 $\mu$m and B is a binder concentration from a depth of 10 $\mu$m to a depth of 100 $\mu$m.

Further, a method for manufacturing a wet friction material of the present invention is comprised the steps of: impregnating a raw paper comprising a fibrous material, a filler and a friction adjustment material with a binder; removing an excessive binder coating and a layer containing much binder, which are formed in an outermost surface layer during the impregnating step, by sucking means; drying the binder in the raw paper; setting the binder in the raw paper; and smoothing at least one surface of the raw paper.

According to the present invention, the excessive resin coating and the resin layer formed along the outermost surface (having a thickness of about 100 $\mu$m) of the friction material of the present invention are reduced. Therefore, the total amount of resin is not affected by this reduction so as to dramatically improve thereby the conformability of the friction material. Further, since the excessive resin coating is few in the surface layer, the fading phenomenon and the changing of the friction material to plastic are prevented. Still further, the surface layer of the friction material has high flexibility, and therefore the friction material can reduce operating shock. The ratio of friction between the resin and a corresponding slid surface is reduced, and hence the friction material possesses a high coefficient of friction. For this reason, it is possible to alleviate the influence of the transfer of additives included in the lubricant oil upon the friction material.

BRIEF DESCRIPTION OF THE DRAWINGS

In the accompanying drawings;

FIG. 31 is a table showing the occurrence of occurred shudder depending on cutting level values at a contact rate of 90%; and FIG. 32 is a table showing the occurrence of occurred shudder at a specific plateau ratio.

PREFERRED EMBODIMENTS OF THE INVENTION

Preferred embodiments of the present invention will be described referring to the accompanying drawings as follows.

Figure 22:
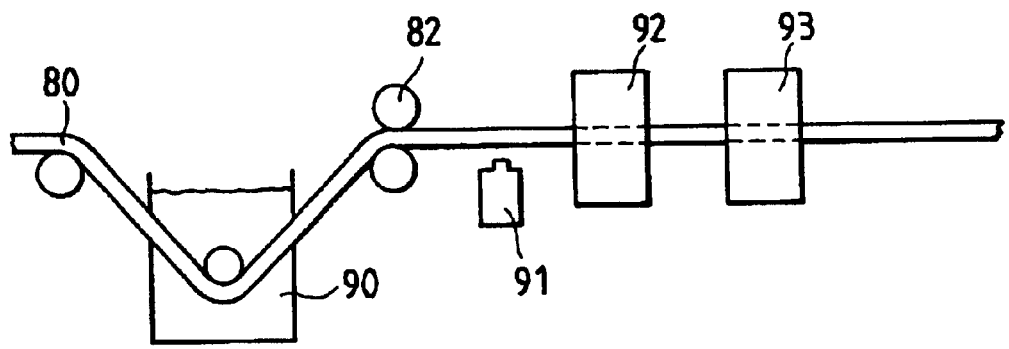
FIG. 22 is a schematic diagram showing an example of a method of manufacturing friction material using an aspirator.

In a manufacturing method shown in FIG. 22, raw paper 80 including a fibrous material, a filler and a friction adjustment material is fed into an impregnation bath 90, so that the raw paper is-impregnated with a binder. The binder-impregnated raw paper is squeezed by a squeezing roller 82, and an excessive binder is removed by an aspirator 91. Subsequently, a diluted solvent evaporates while the raw paper passes through a drying furnace 92, and the raw paper sets when heated by a setting furnace 93. At this time, a setting temperature is decreased by 10 to 50° C. from a setting temperature of the binder, or a setting time is reduced while the setting temperature is left unchanged, that is, the time is shorter than a time necessary for completely setting the binder. Accordingly, the raw paper sets while retaining its flexibility even after the end of the setting process.

Incidentally, the filler and the friction material used in the present invention are similar to the conventional ones. For example, the filler is diatomaceous earth, clay, wollastonite, silica, carbonate and the like, and the frictional material is cashew resin, resin particle, rubber particle, graphite, cokes, mica and the like. The filler is a particle material which contributes to the elasticity of the friction material. On the other hand, the friction adjustment material contribute to the properties of the frictional material.

Figure 23:
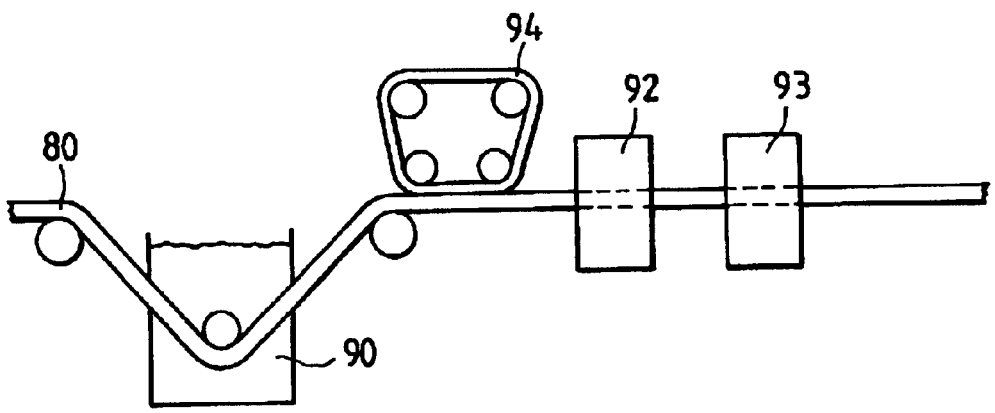
FIG. 23 is a schematic diagram showing an example of a method of manufacturing friction material using an absorbing material.

In an example of the manufacturing method shown in FIG. 23, after coming out of the impregnation bath 90, the raw paper 80 comes into close contact with an absorbing material 94 while circulating, whereby an excessive binder is absorbed by the absorbing material. Thereafter, a diluted solvent evaporates in a drying furnace 92, and the friction material sets when heated in a setting furnace 93. At this time, the setting temperature is decreased by 10 to 50° C. from a setting temperature of the binder, or the setting time is reduced while the setting temperature is left unchanged, that is, the time is shorter than a time necessary for completely setting the binder. Accordingly, the friction material sets while retaining its flexibility even after the end of the setting process.

Figure 24:
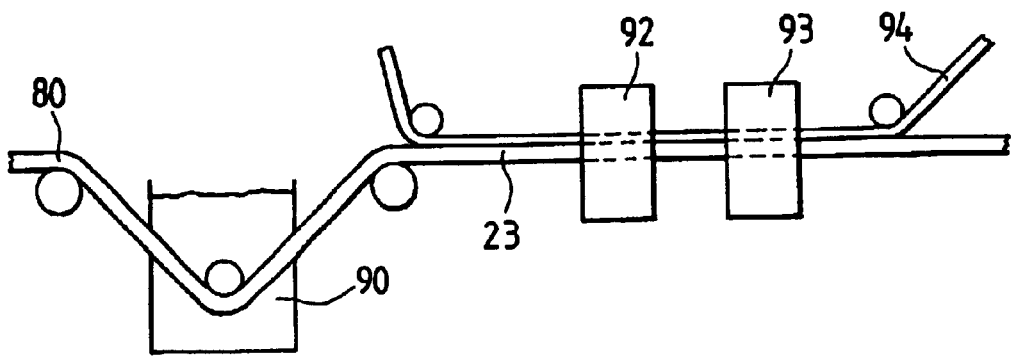
FIG. 24 is a schematic diagram showing another example of the manufacturing method using the absorbing material.

In an example of the manufacturing method shown in FIG. 24, after coming out of the impregnation bath 90, the raw paper 80 comes into close contact with an absorbing material 94 while circulating, whereby an excessive binder is absorbed by the absorbing material. Thereafter, the friction material 23 is subjected to drying and setting processes while remaining in close contact with the absorbing material. After the completion of the setting process, the absorbing material is detached from the friction material. As a result of this, the interior surface of the friction material which is in contact with the absorbing material is not directly heated in the setting process. Hence, the friction material sets while retaining flexibility.

Figure 25:
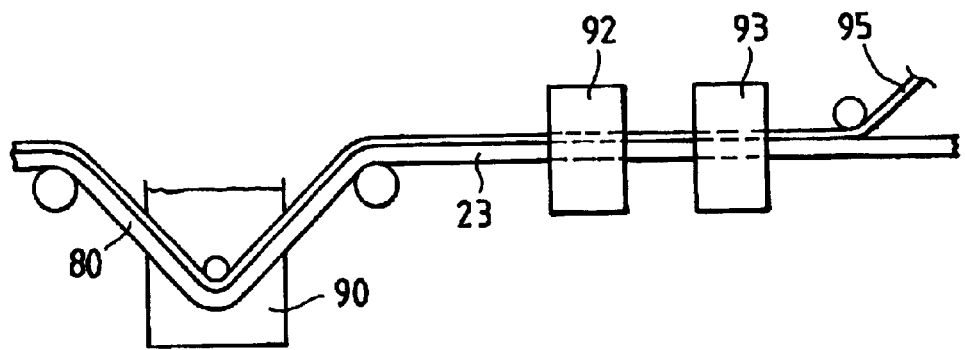
FIG. 25 is a schematic diagram showing still another example of the manufacturing method using a synthetic resin sheet.

In an example of the manufacturing method shown in FIG. 25, the raw paper 80 and a synthetic resin sheet 95 are cemented together. After having left the impregnation bath 90, the paper and sheet cemented together are subjected to drying and setting processes while remaining in close contact with each other. After the completion of the setting process, the synthetic resin sheet 95 is detached from the raw paper. As a result of this, neither an excessive binder coating nor a high-concentration binder layer is formed along the interior surface of the friction material by means of surface tension of the binder, and the interior surface of the friction material is not directly heated in the setting process. Hence, the friction material can set while retaining its flexibility.

Figure 26:
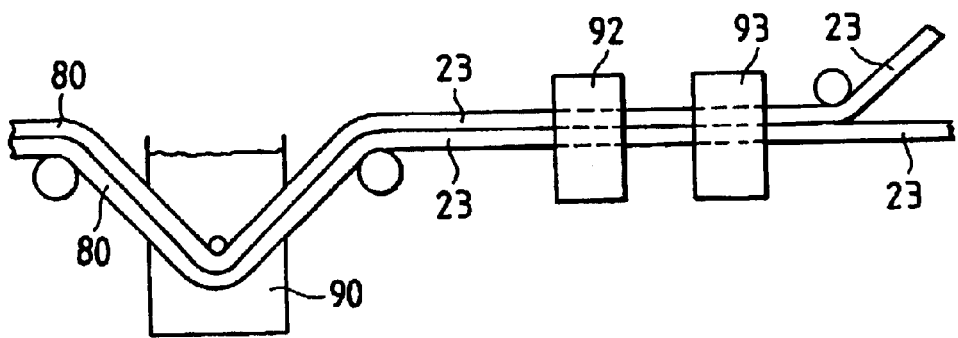
FIG. 26 is a schematic diagram showing an example in which two sheets of friction material is laminated together.

In an example of the manufacturing method shown in FIG. 26, two sheets of raw paper 80, consisting of the same substance or different substances, are cemented together, and the thus laminated raw paper passes through the impregnation bath 90, the drying furnace 92, and the setting furnace 93. After the completion of the setting process, the two sheets of paper are separated from each other. As a result of this, neither an excessive binder coating nor a high-concentration binder layer is formed along the interior surface of each paper by means of surface tension of the binder, and the interior surface of the paper is not directly heated in the setting process. Hence, the friction material can set while retaining its flexibility. Moreover, this method makes it possible to manufacture twice as much frictional material as the conventional manufacturing method, thereby resulting in high production efficiency and reduced cost.

Figure 27:
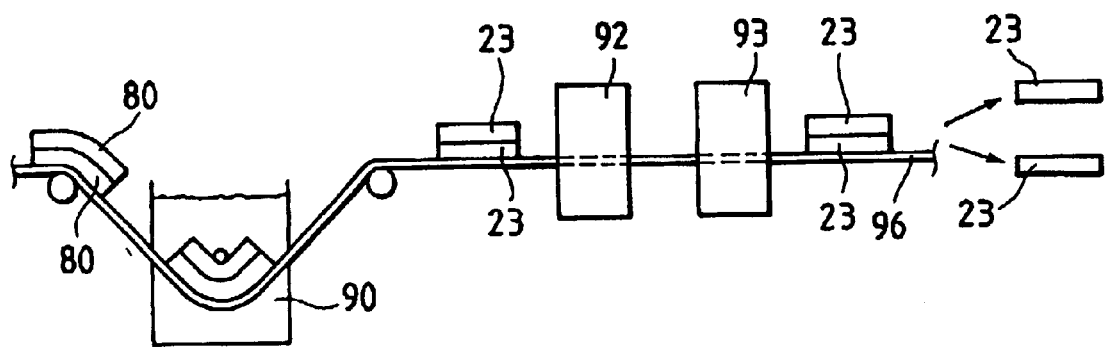
FIG. 27 is a schematic diagram showing an example in which the friction material is previously stamped.

A manufacturing method shown in FIG. 27 is based on the same principle as the method shown in FIG. 26. Raw paper is previously cut into pieces of sheet or products, and two sheets of raw paper are carried by a conveyor 96 while they are laminated together.

As similar to the examples shown in FIGS. 22 and 23, also in the examples of the manufacturing method shown in FIGS. 24 to 27, the setting temperature is decreased by 10 to 50° C. from a setting temperature of the binder, or the setting time is reduced while the setting temperature is left unchanged, that is, the time is shorter than a time necessary for completely setting the binder. Accordingly, its flexibility can be retained even after the end of the setting process as well as more exactly adjusted.

As mentioned above, in the embodiments of the present invention have been described, the excessive binder layer and the high-concentration binder layer formed along the outermost layer of the friction material by means of the surface tension of the binder are removed, and the excessive binder layer and the high-concentration binder layer are prevented from being formed. The surface of the friction material which sets while retaining its flexibility is used as a product slide surface. As a result of subjecting the friction material to smoothing processes such as heating, pressurizing, and molding, the smoothness of the flexible surface is promoted, and a frictional material with a superior smooth surface can be obtained. Further, subjecting the friction material to a smoothing process and a bonding process at the same time enables the friction material having a superior smooth surface to be bonded to a core plate.

For the convenience of comprehension, a technique for controlling the smoothness of friction material will be explained. Commonly, smoothness is controlled by roughness. However, fibers of the friction material are not evenly arranged along the surface of the friction material. The fibers are porous and entangled. The roughness of the friction material greatly changes depending on the influence of pores formed in a depthwise direction of the friction material. Moreover, the surface of the friction material is rougher than the surface of common metal, and hence the method for controlling the roughness of the metal surface is not applicable to the friction material. For this reason, the shape and roughness of the friction material are measured by use of an Abbott load curve which corresponds to a cumulative distribution function of statistics, whereby the roughness is controlled. A method of controlling the friction material will be explained while describing the features of the friction material of this invention.

Figure 28:
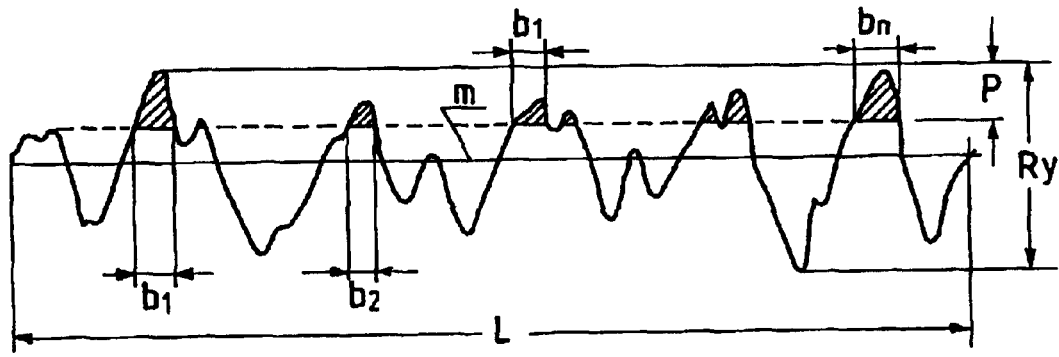
FIG. 28 is an explanatory view illustrating a relative load length.

As shown in FIG. 28, a relative load length (tp) to be measured by a roughness measure is obtained by the steps of: defining a measuring line having a predetermined length L along a mean level of projections of an uneven sampling curve of the surface of the friction material; slicing the projections along the measuring line at a level spaced by a predetermined level "p" away from the peak of the highest projection; and expressing the lengths of surfaces obtained as a result of the slicing of the projections on a percentage basis with respect to the predetermined measuring length L.

In other words, the relative load length tp at the level p will be expressed as:

There is a method of expressing the slicing level "p", i.e., a depth from the peak of the highest projection, in micrometers or percentages on the assumption that the highest peak is 0% and the lowermost valley is 100%. A difference between the highest peak and the lowermost valley is equal to the maximum height Rmax.

The shape of the lowermost valley is not stable by the influence of pores formed in a depthwise direction of the friction material. For this reason, the vertical axis of the Abott load curve expresses the maximum height (a slicing level), and hence valleys having a contact ratio of more than 90% extremely vary. In view of the control, the slicing level is expressed not in percentages but in micrometers.

Figure 29A:
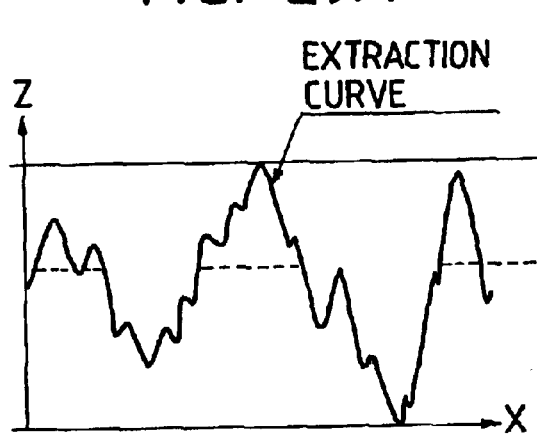
FIGS. 29A and 29B are explanatory diagrams illustrating a load curve.
Figure 29B:
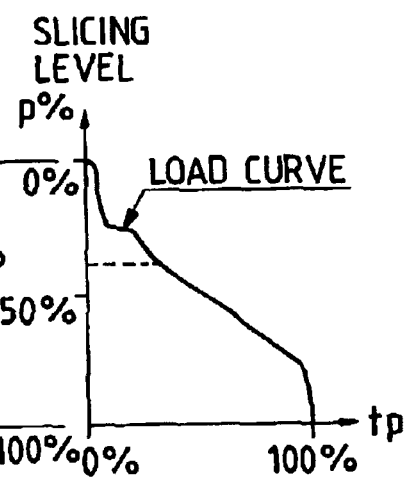

FIG. 29A shows the same extraction curve as FIG. 28, and FIG. 29B is the Abott load curve (also called as a contact ratio curve) which shows the relationship between all slicing levels p ($\mu$m) of the extraction curve and the relative load length tp (%) at that slicing level.

In the conventional friction material, the excessive binder layer is formed up to a depth of 100 $\mu$m from the surface of the friction material by means of surface tension. Contrary to this, in the friction material of the present invention, binder is formed in such a way that fibers of the friction material, each having a thickness of about 10 $\mu$m, are evenly covered with a coating having a thickness of about 1$\mu$m. This product control (inspection) method using the above mentioned Abbot load curve has some problems. Specifically, aside from the excessive binder layer, there is dirt and collected binder to a depth of about 2 $\mu$m from the surface of the friction material. In a left portion of the load curve (corresponding to the surface side), the slicing level of the extraction curve is equal to the maximum height Rmax, and therefore the roughness measure picks up noise such as a dirt and collected binder, which greatly changes a measured value. In this way, the shape of the load curve is unstable depending on measured locations, which makes it difficult to correctly control the roughness of the friction material. Hence, when the roughness is controlled, a load curve except its noise portion (which is also called as initial abrasion portions in the case of metal) is used.

Figure 30:
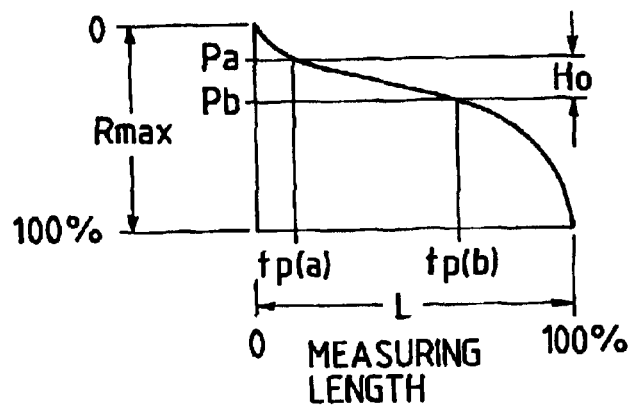
FIG. 30 is a diagram illustrating a load curve.

FIG. 30 again shows the load curve. Assuming that tp(a) is set to 5% which corresponds to a noise portion and a slicing level P(a) when tp(a) is set to 5% is taken as a height 0, a depth from the height 0 to Pb is expressed as micrometers and this depth is used for a drawing control value as a control value (a plateau ratio) of the state of the surface of the friction material.

The height from 0 to Pa is very small and is greatly affected by noise, and hence this height has no substantial influence over the frictional properties.

Figure 15:
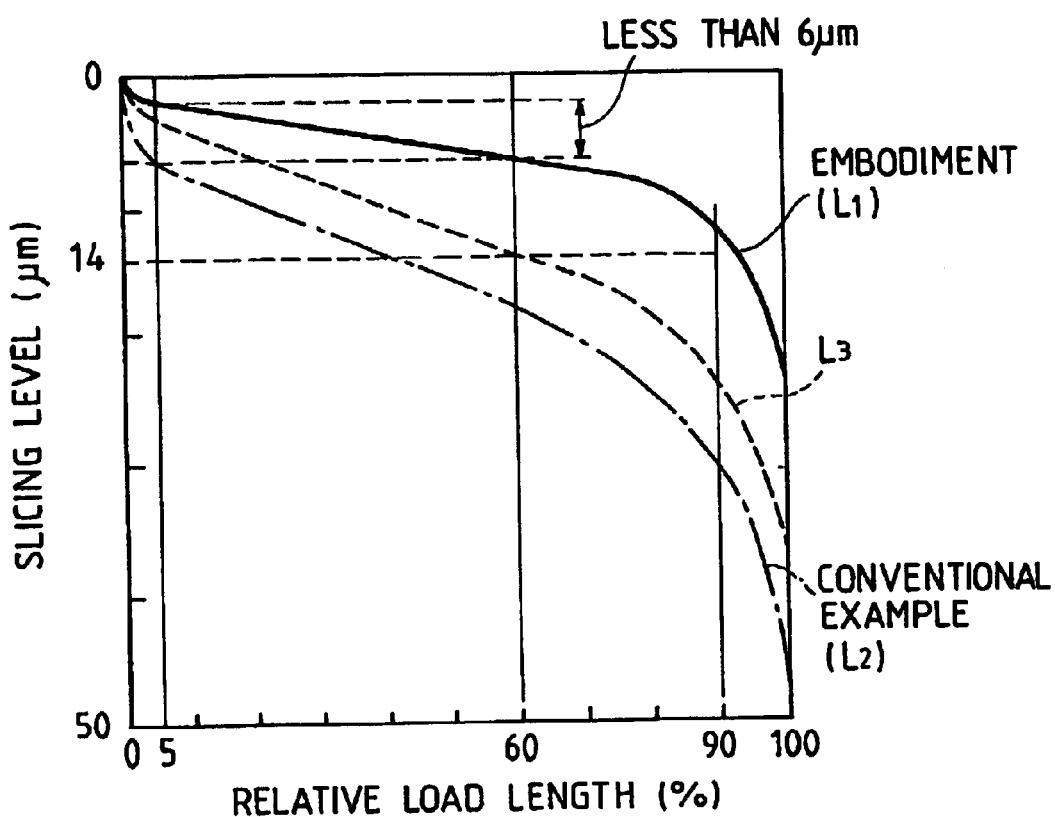
FIG. 15 is a diagram showing a comparison according to international standards which represent surface smoothness.
Figure 16:
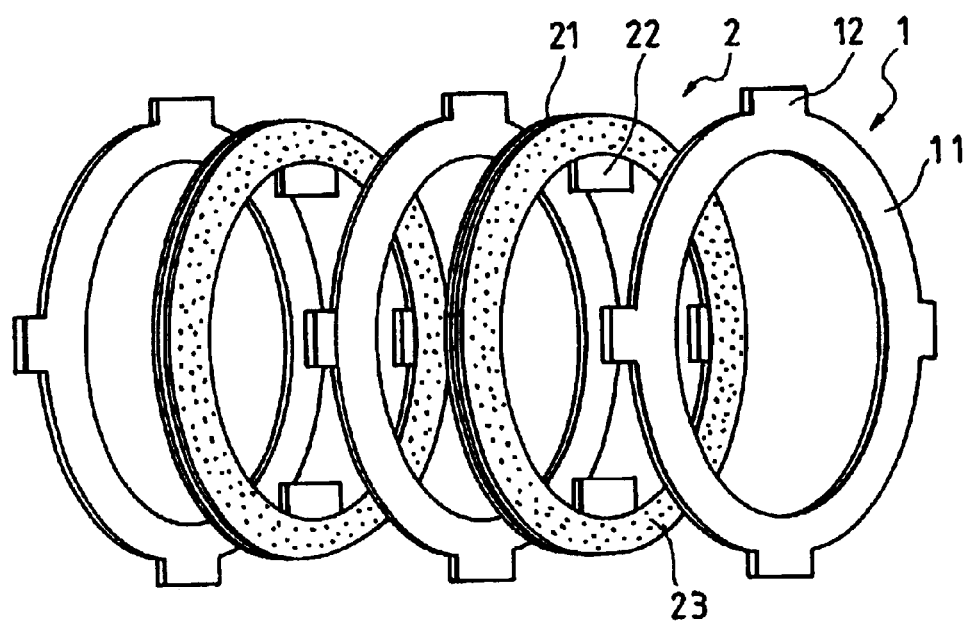
FIG. 16 is a perspective view showing the friction material.
Figure 17:
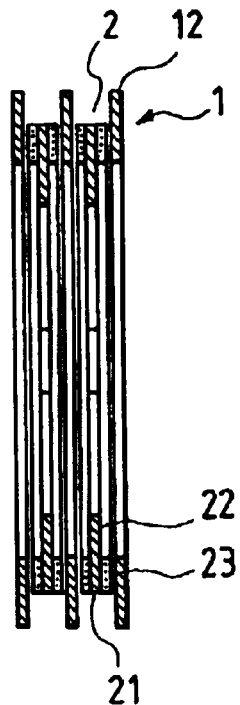
FIG. 17 is a cross-sectional view showing an assembled friction material.
Figure 18:
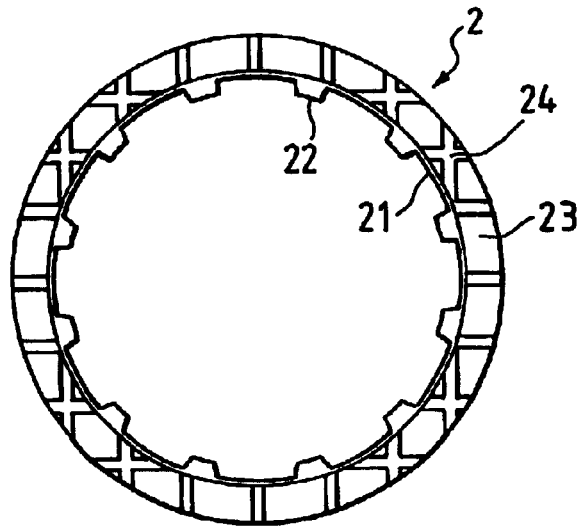
FIG. 18 is a plan view of one example of the friction material.
Figure 19:
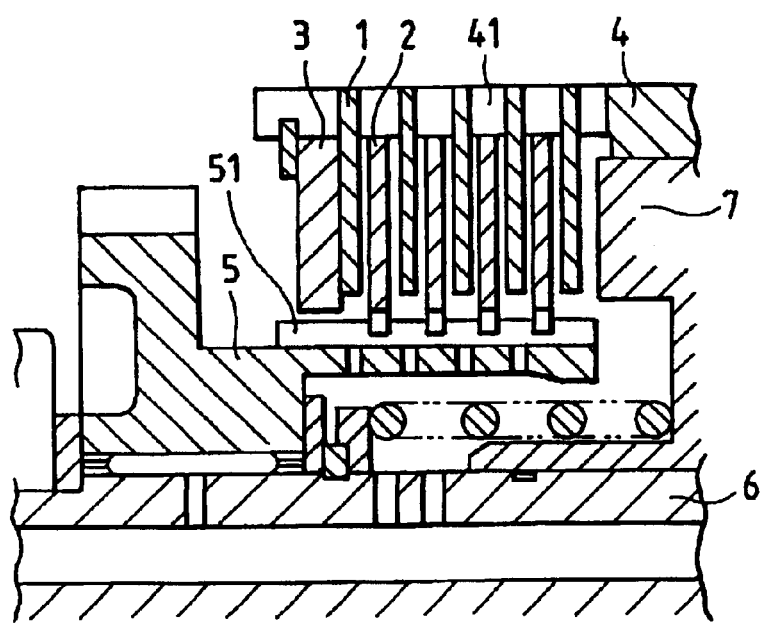
FIG. 19 is a side cross-sectional view showing one example of a friction engaging apparatus to which the wet friction material is applied.

The area between Pa and Pb (where the contact ratio tp is 5 to 60%) is substantially linear as it is shown in the load curve of FIG. 15, and the feature of the shape of the friction material is represented by the inclination of the curve. This area of the friction material is stable and has few variations. This area is chiefly in contact with a corresponding surface, and hence the shape of this area is most important in view of frictional properties. A value of the plateau ratio becomes smaller as the area between Pa and Pb becomes longer and flatter, thereby resulting in stable performance.

In other words, the smaller the difference, between the depth Pa (a depth except for a noise portion) where the contact ratio tp(a) is 5% and the depth Pb where the contact ratio tp(b) is 60%, becomes, the smoother the surface becomes, thereby resulting in superior performance. The area having a contact ratio from 5 to 60% has a depth of less than 6p4m, and hence a plateau ratio is expressed as Hp (60-5)<6 μm.

In an initial state, the binder coating which covers the fibrous base material of the outermost layer is rigid and less flexible and forms microprojections. Hence, the binder coating is not necessarily smooth, and only the projections of the binder come into contact with a driven plate (a corresponding slide surface) from a microscopic viewpoint, thereby forming a slide surface. For this reason, the contact area is small, and a coefficient of friction between the binder and the driven plate is originally small. Therefore, an initial coefficient of friction of the binder coating is small. Through the repetition of sliding action, the binder wears out, and a flexible fibrous base material appears on the slide surface. As a result of this, the contact area becomes larger and smoother. The thus appeared fibrous base material having a large friction coefficient increases the friction coefficient of the friction material. In this way, the friction coefficient of the friction material becomes greater through the running-in process. Factors which increase the friction coefficient are a contact ratio of a fiber to a binder and a true contact area. Conversely, if it is possible to increase these two factors from the initial state of the friction material, it will become possible to provide a friction material whose friction coefficient is stable from the initial state (that is, a stable friction coefficient obtained as a result of the repetition of sliding action of the friction material, in the case of the conventional friction material).

To increase a contact ratio of a fiber to a binder in the initial state, the concentration of an excessive binder formed in the outermost layer by means of the surface tension of the friction material is expressed by (MB) which is in the range of 0.85 to 1.15, on the assumption that a binder concentration from the surface to a depth of 10 μm (the minimum unit which allows the friction material to be sliced for analyzing the concentration of the binder contained in the friction material (impregnation rate of resin) is (A), and a binder concentration from a depth of 10 μm to a depth of 100 μm is (B). When the ratio (A/B) is in excess of 1.15, the initial coefficient of friction becomes 10% lower than the stable friction coefficient. The standard for variations of the friction coefficient is determined in such a way that the variation does not exceed a torque capacity variation range of ±10% which serves as an index of the clutch design. For this reason, 10% drop in friction coefficient matching −10% which is the lower limit of the torque capacity variation is set as the limit. If the ratio A/B is made smaller, the binder concentration in the surface of the friction material decreases, thereby leading to a stable friction coefficient. However, the strength of the friction material is also maintained by the binder, and hence the strength of the surface of the friction material considerably decreases as the ratio A/B drops, thereby resulting in increased abrasion and a drop in peel life. In this invention, the ratio is set to 0.85 based on the limit under harsh working conditions and the stability of the friction coefficient.

Figure 20:
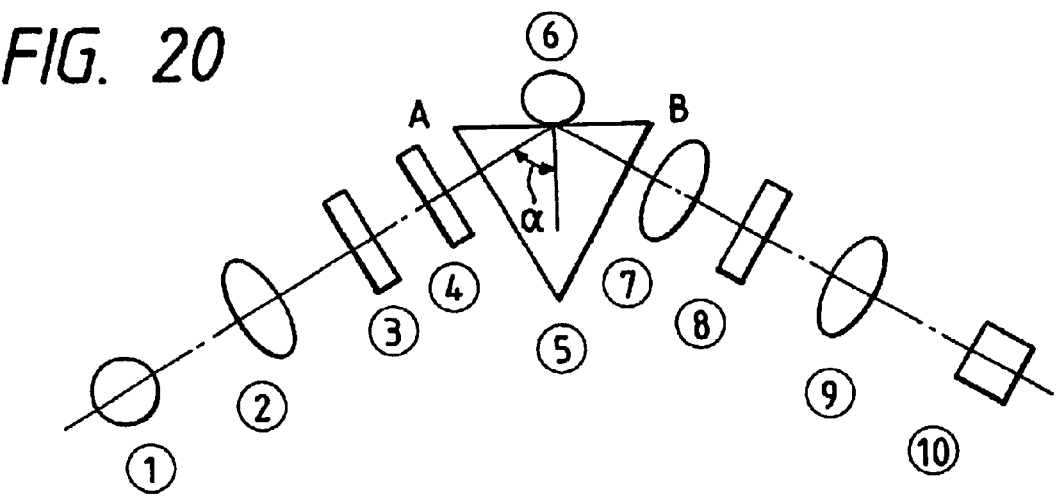
FIG. 20 is a diagram showing the principle of a contact microscope.

Moreover, more than 20% of the true contact area of the friction material is in oil under a surface pressure of 1 MPa. Since more than 20%, preferably in a range of 20% to 70%, of the true contact area is in oil, the friction material can conform in a remarkably improved manner. If the true contact area is under 20% (the area is around 3 to 5% in the case of a conventional friction material), the friction coefficient varies more than 10%. The improvement of the true contact area is intended to improve the flexibility of the friction material particularly (improve Young's modulus) under a low surface pressure while the fiber contact ratio is increased, and it is also intended to further smooth the surface geometry. To measure the true contact area, a contact microscope developed by Otani of Chiba University of Technology and Kimura of Tokyo University is used wherein a true contact area is measured through a prism. The principle of this contact microscope is shown in FIG. 20. The principle of the microscope will be briefly explained. Light emanated from the light source is converted to a polarized light by a polarizer (3) and a ¼ wavelength plate 4). When the polarized light enters a contact surface, the polarized light is totally reflected from a non-contact portion and partially reflected from a contact portion. The totally reflected light and the partially reflected light have different phase-hops. If the microscope is adjusted such that either of the reflected light becomes linear polarized light, a polarizer (8) allows either the totally reflected light or the partially reflected light to pass. As a result of this, there arises a sharp brightness contrast between the contact portion and the non-contact portion, which enables a true contact area to be measured with superior brightness.

In the drawings, reference numeral (1) represents the light source; (2), a collimator lens; (3), a polarizer; (4), a ¼ wave length plate; (5), a prism; (6), an object to be measured; (7), an opposed lens; (8) a polarizer; (9) a photographing lens; and (10), a CCD camera.

In another embodiment, a longitudinal strain is increased larger than that of the conventional friction material under a low surface pressure (less than 1.5 MPa). The friction material has more flexibility under a low surface pressure compared with the conventional friction material. By virtue of this flexibility, it is possible to ensure 20% of true contact area from an initial stage of contact. Thus, the friction material becomes considerably easy to conform.

Figure 21:
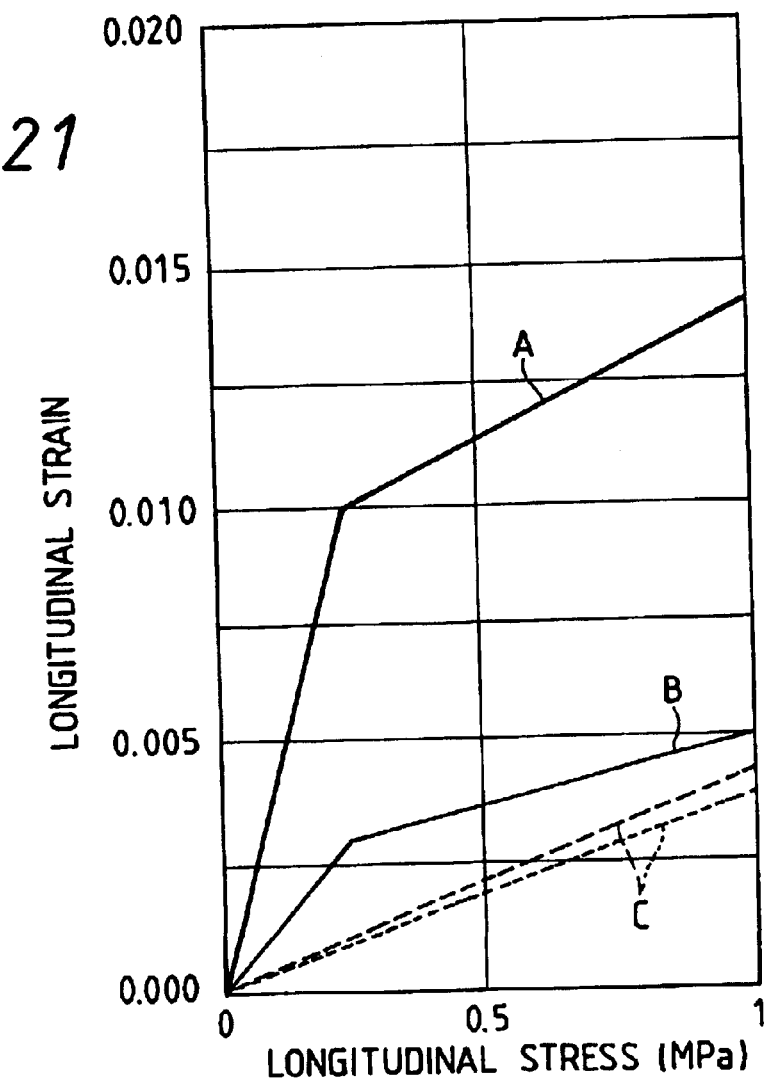
FIG. 21 is a plot showing the relationship between stress and strain.

A diagram shown in FIG. 21 has a longitudinal axis which represents a longitudinal strain (a strain in the direction of stress) and a horizontal axis which represents a longitudinal stress (MPa). In this diagram, the area defined between lines A and B designates a range for the friction material of the present invention, and a dotted line C designates the conventional friction material.

In the drawing, if the longitudinal strain is in excess of the upper limit of the range, the strength of the surface of the friction material drops, thereby leading to increased abrasion and decreased peel life. Contrary to this, if the longitudinal strain is less than the range, a high strength of the surface of the friction material brings about occurred shudder and deteriorated initial conformability (10% or more of variations of friction coefficient). The feature of this embodiment is that it does not depend on the surface geometry.

Figure 8:
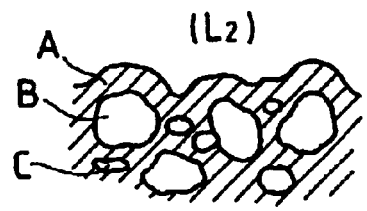
FIG. 8 is a schematic representation showing one example of the construction of the outermost layer of the conventional example.
Figure 9:
FIG. 9 is a schematic representation showing a surface geometry of the conventional example.
Figure 10:
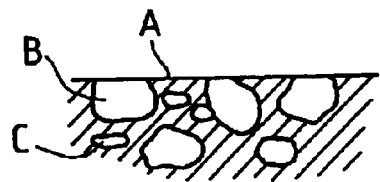
FIG. 10 is a schematic representation showing another example of the construction of the outermost layer of the conventional example.
Figure 11:
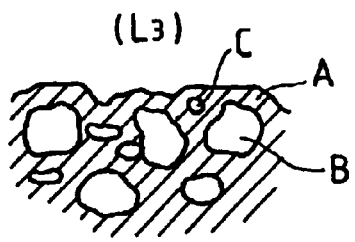
FIG. 11 is a schematic representation showing still another example of the construction of the outermost layer of the conventional friction material.
Figure 12:
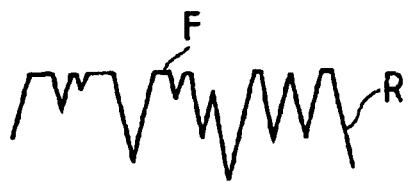
FIG. 12 is a schematic representation showing the surface geometry of the conventional friction material.

When the friction material is composed of 40 wt. % natural pulp and organic synthetic fiber, 25% phenol resin, and 15 wt. % friction adjustment agent and 20 wt. % filler for a total of 100 wt. %, the friction material manufactured according to the present invention is designated by $L_1$ and a friction material manufactured according to the conventional method is designated by $L_2$. A friction material which is improved by pressing $L_2$ against a smoothing heat plate at a temperature of 350 to 550° C. is designated by $L_3$. As previously mentioned, FIG. 8 is an explanatory view schematically showing the construction of the surface of the conventional friction material ($L_2$), and FIG. 9 is a surface contour line R showing the enlarged surface geometry of the friction material. It can be seen that the surface contour line R is not smooth. FIGS. 11 and 12 are similar drawings for $L_3$, and the surface contour line has smoothed areas F.

Throughout the drawings, A represents a resin layer; B, fiber, and C, a filler.

Figure 5:
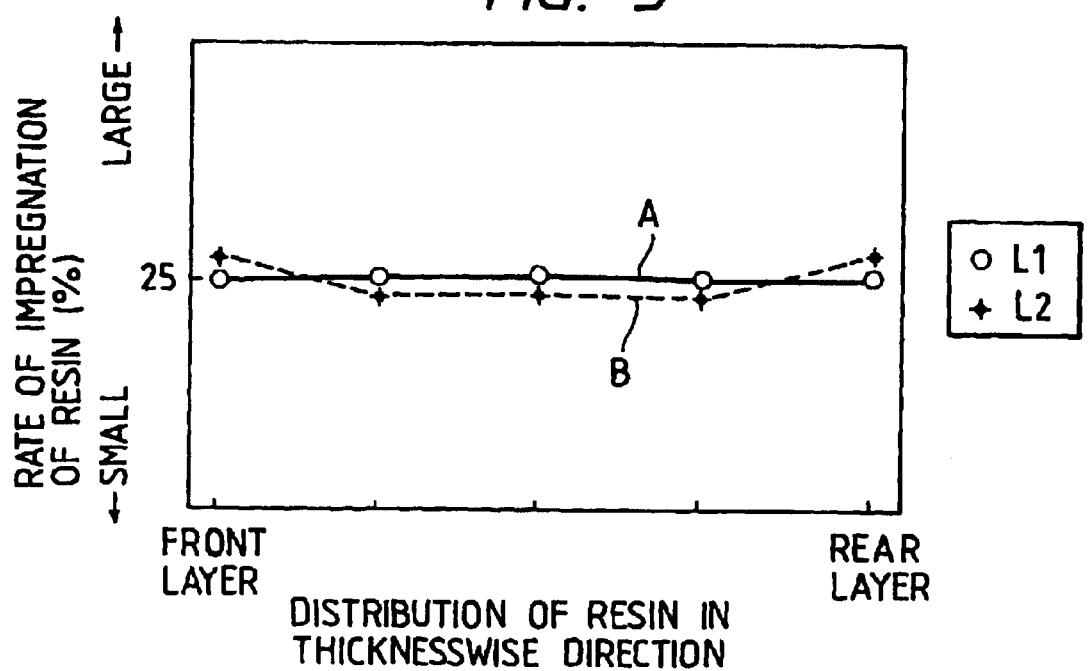
FIG. 5 is a diagram showing the distribution of an impregnation rate of resin in a thicknesswise direction.
Figure 6:
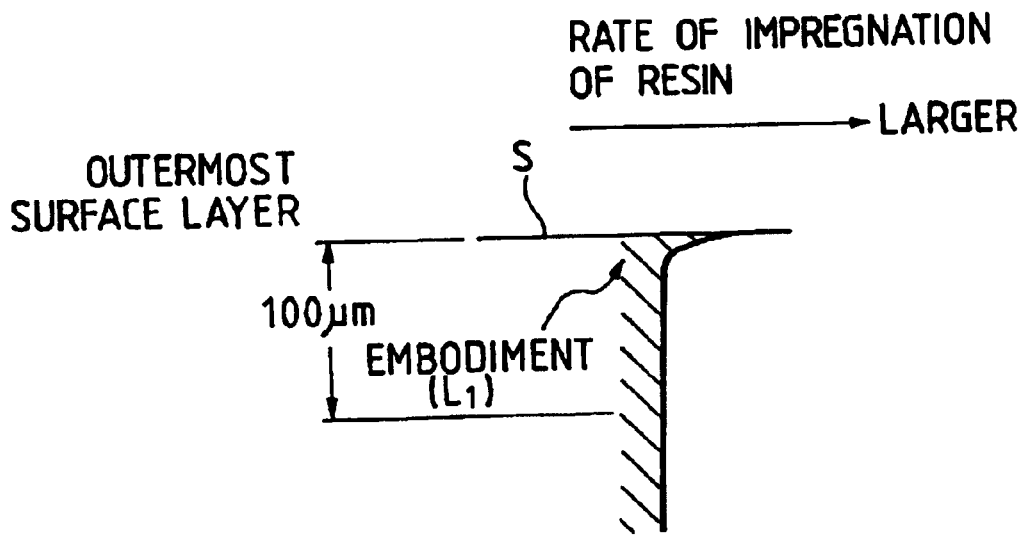
FIG. 6 is a diagram showing an impregnation rate of resin in a thicknesswise direction of the present invention.
Figure 7:
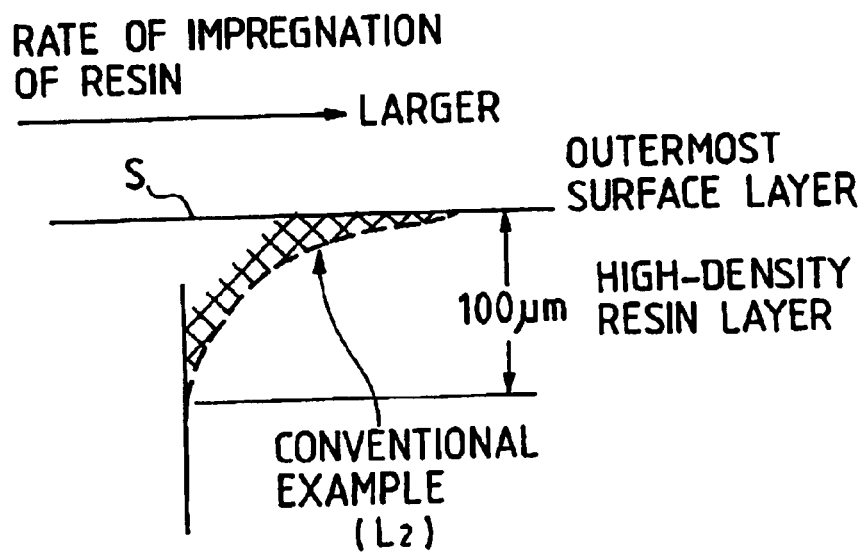
FIG. 7 is a diagram showing an impregnation rate of resin in a thicknesswise direction of a conventional example.
Figure 13:
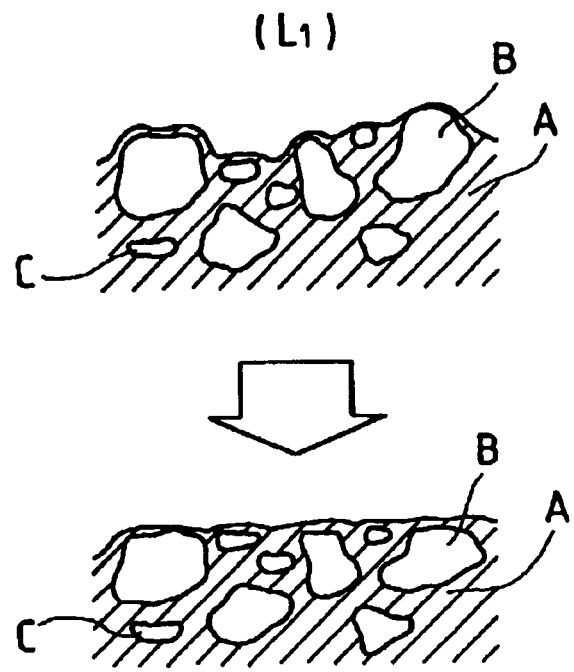
FIG. 13 is a schematic representation showing the construction of the outermost surface layer of the present invention.
Figure 14:
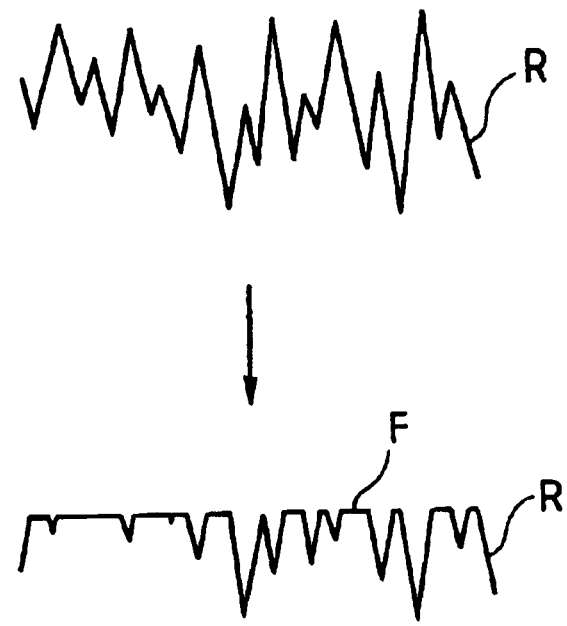
FIG. 14 is a schematic representation showing a surface geometry of the friction material of the present invention.

FIGS. 13 and 14 show the friction material $L_1$ of the present invention. A lower diagram in FIG. 14 designated by an arrow directed in a downward direction shows the smoothed areas F obtained after the friction material has been smoothed. FIG. 6 shows the rate of impregnation of resin into the surface layer of $L_1$, and FIG. 7 shows the rate of impregnation of resin into the surface layer of $L_2$. In these drawings, S designates the surface layer, and the depth of the layer is represented by the longitudinal axis of the drawings and the rate of impregnation of resin is represented by the horizontal axis. The rate of impregnation of resin becomes larger towards the right side of the horizontal axis. FIG. 5 is a graph showing the same rate of impregnation of resin. In this drawing, the longitudinal axis represents the ratio of impregnation of resin in percentages (the rate becomes larger towards the upper end of the longitudinal axis), and the lateral axis represents the distribution of resin in a thicknesswise direction of the friction material (the left side of the graph shows the front layer and the right side of the graph shows the rear surface to be bonded to the steel plate).

Line A shows $L_1$, and broken line B shows $L_2$. The ratio of impregnation increases towards the surface layer in the case of $L_2$.

Figure 1:
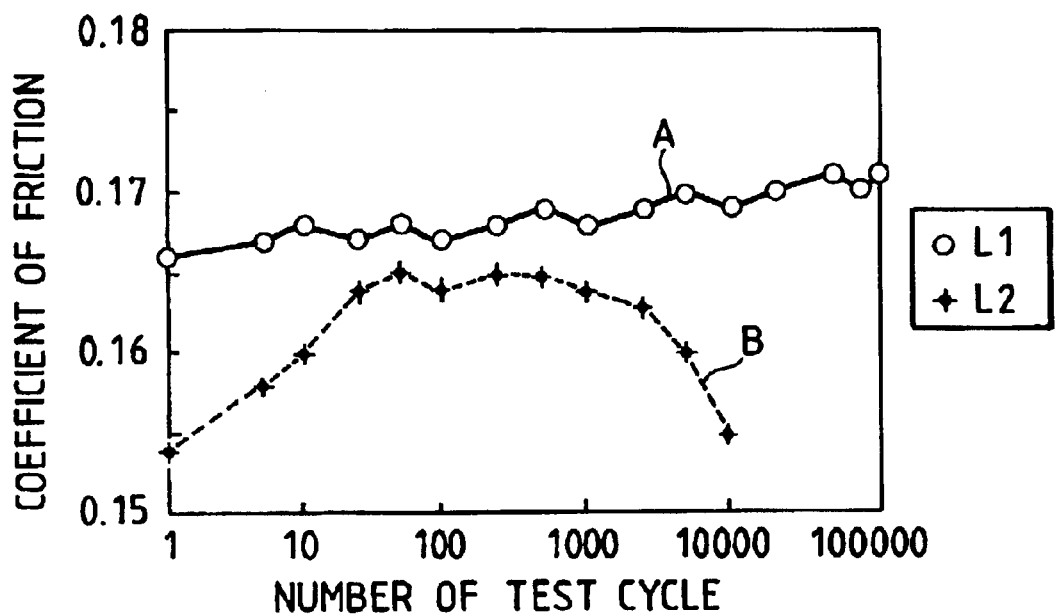
FIG. 1 is a diagram showing the relationship between the number of test cycles and a coefficient of friction.

FIG. 1 shows the relationship between the number of test cycles and a coefficient of friction, wherein the longitudinal axis shows a coefficient of friction and the lateral axis shows the number of test cycle. A shows the relationship for $L_1$ and B shows the relationship for $L_2$. $L_1$ is substantially constant, but $L_2$ is low at the beginning of the test cycles but progressively increases.

Figure 2:
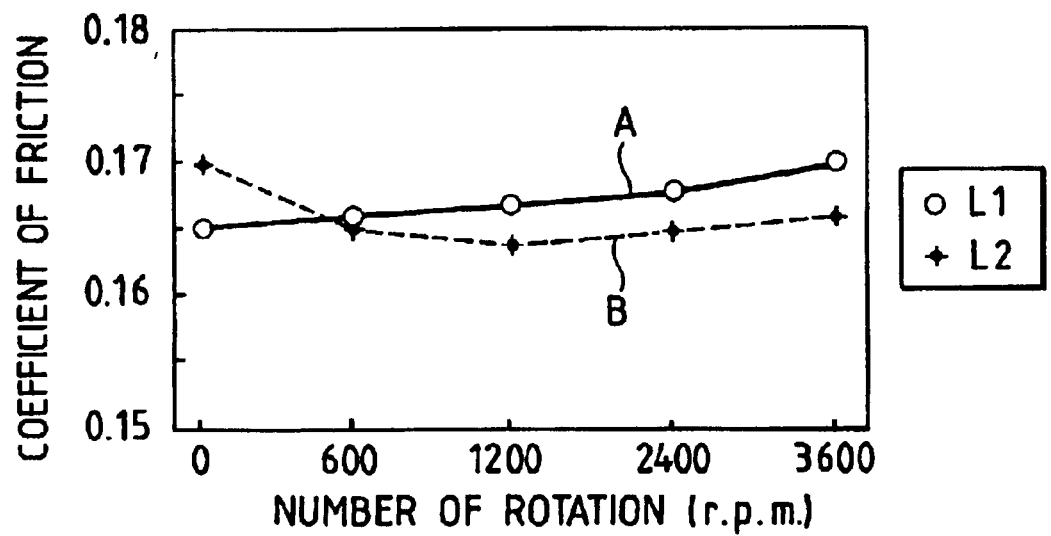
FIG. 2 is a diagram showing the relationship between the number of rotation and a coefficient of friction.
Figure 3A:
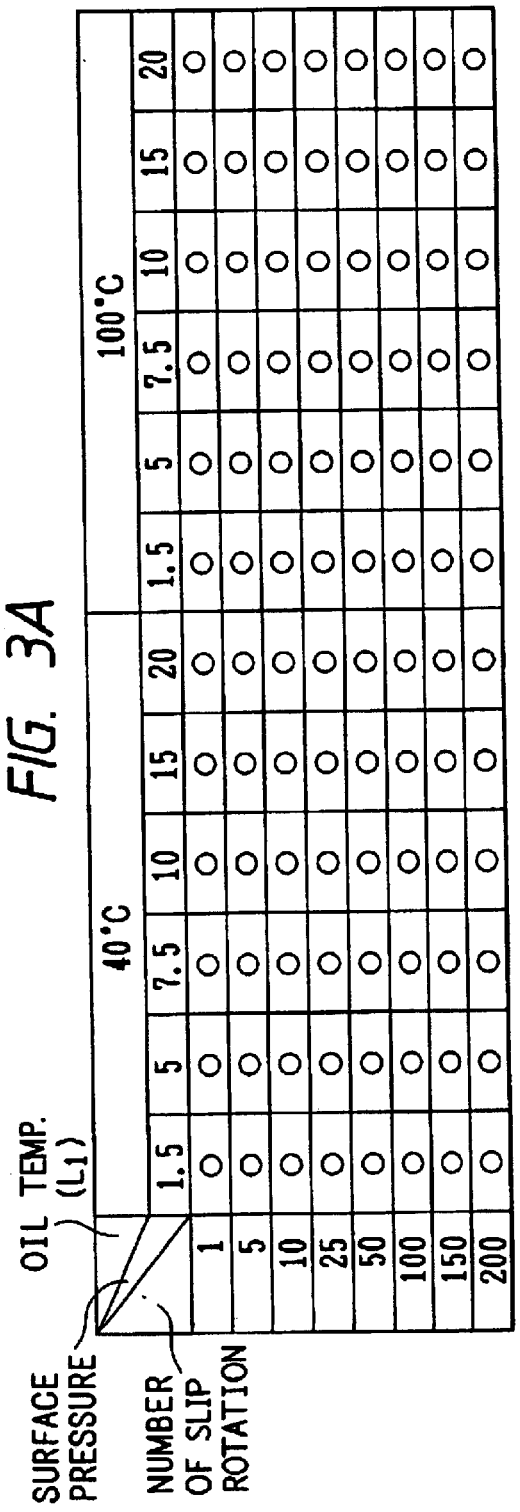
FIGS. 3A and 3B are tables showing the occurrence of shudder.
Figure 3B:
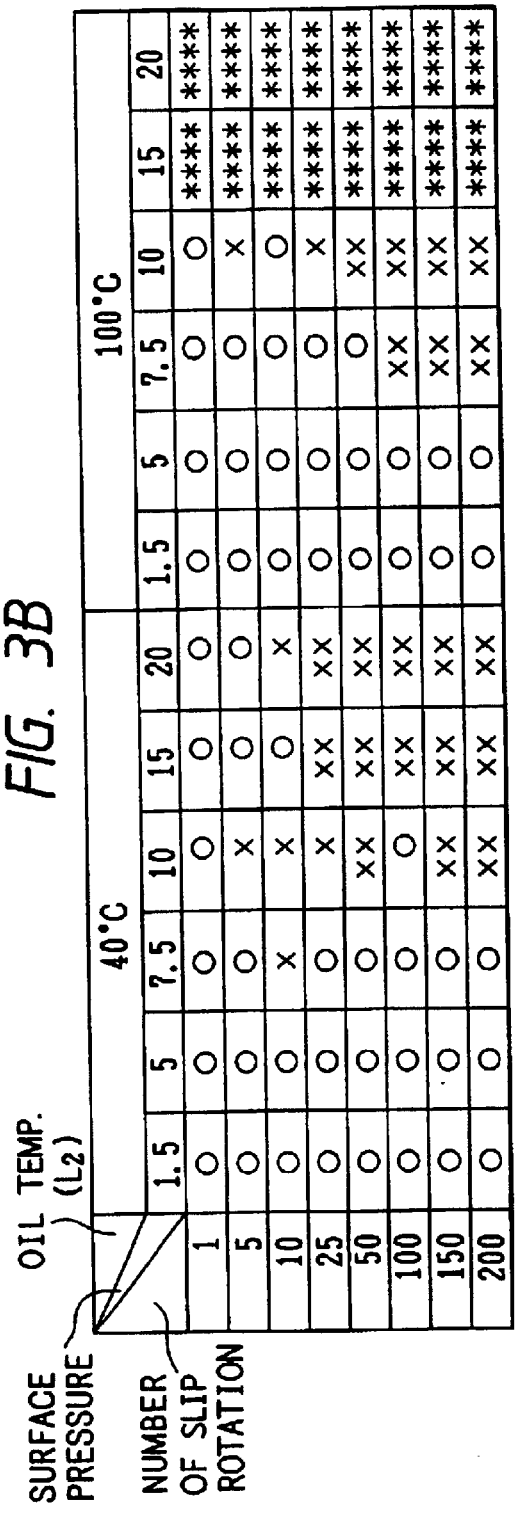
Figure 4:
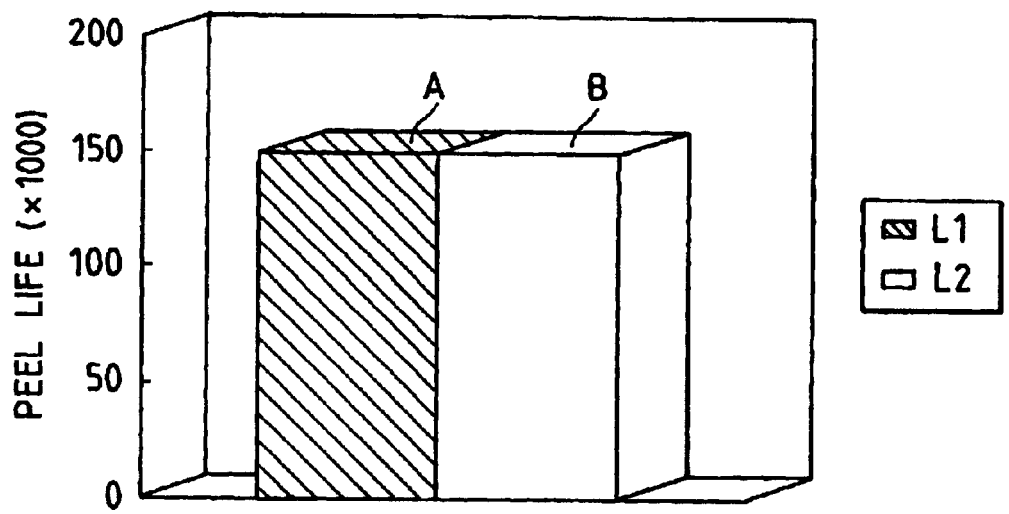
FIG. 4 is a diagram showing a comparison of peel lives.

FIG. 2 shows the relationship between the number of rotation and a friction coefficient. The longitudinal axis of FIG. 2 shows a coefficient of friction, and the lateral axis shows the number of rotation (r.p.m.). Line A shows the relationship for $L_1$, and line B shows the relationship for $L_2$. FIG. 4 shows the relationship between the number of compression and a peel life for $L_1$ and $L_2$. In this respect, there is no substantial difference between them. FIGS. 3A and 3B show the occurrence of occurred shudder. FIG. 3A shows the occurrence of occurred shudder for $L_1$, and FIG. 3B shows the occurrence of occurred shudder for $L_2$. 40° C. and 100° C. show the temperatures of lubricant oil, columns of the tables show the number of slip rotation (i.e., the number of relative rotation), and rows of the tables show surface pressures ($kg/cm^2$). It can be understood that no occurred shudder occurs under any conditions for $L_1$ (whereas, the occurrence of occurred shudder is impossible for surface pressures 15 and 20 in the case of $L_2$).

FIG. 31 shows the occurrence of occurred shudder depending on slicing levels for a contact ratio of 90%. The test employed harsh conditions as an occurred shudder generation environment, that is, a temperature of 100° C. for lubricant oil and 200 r.p.m. for the number of slip rotation. When 16 $\mu$m, medium occurred shudder arises at a surface pressure of 20 $kg/cm^2$. When less than 14 $\mu$m, no occurred shudder arises. FIG. 32 shows the occurrence of occurred shudder using a plateau rate: HP(60-5). As with the test shown in FIG. 31, this test also employed harsh conditions as an occurred shudder generation environment, that is, a temperature of 100° C. for lubricant oil and 200 r.p.m. for the number of slip rotation. When 8 $\mu$m, medium occurred shudder arises at a surface pressure of 20 $kg/cm^2$. When less than 6 $\mu$m, no occurred shudder arises.

FIG. 15 shows a comparison between $L_1$, $L_2$, and $L_3$ for load curves. In the diagram shown in this drawing, the lateral axis represents a relative load length, and the longitudinal axis shows a slicing level (i.e., a depth). For $L_1$ of the present invention, the relative load length sharply increases as the slicing level increases, and it can be seen that projections of the surface of the friction material are smoothed.

As mentioned above, the excessive resin coating and the resin layer formed along the outermost surface (having a thickness of about 100 $\mu$m) of the friction material of the present invention are reduced, and therefore the total amount of resin is not affected by this reduction, whereby the conformability of the friction material is dramatically improved. Further, since the excessive resin coating is few in the surface layer, the fading phenomenon and the changing of the friction material to plastic are prevented. Still further, the surface layer of the friction material has rich flexibility, and therefore the friction material can reduce operating shock. The ratio of friction between the resin and a corresponding slid surface is reduced, and hence the friction material possesses a high coefficient of friction. For this reason, it is possible to alleviate the influence of the transfer of additives included in the lubricant oil upon the friction material.

What is claimed is:

1. A method for manufacturing a wet friction material comprising the steps of:
    impregnating a raw paper comprising a fibrous material, a filler and a friction adjustment material with a binder;
    removing an excessive coating of binder, which is formed in an outermost surface layer during said impregnating step, by sucking means;
    drying said binder in said raw paper;
    setting said binder in said raw paper; and
    smoothing at least one surface of said raw paper.

2. A method according to claim 1, wherein said removing step is performed simultaneously with at least one of said drying and said setting steps.

3. A method according to claim 2, wherein said sucking means is an absorbing member, which closely contacts a surface of said raw paper, for absorbing and removing the excessive coating of binder; and
    wherein said drying and setting steps are performed while said absorbing member is closely contacted with said raw paper, and said absorbing member is detached from said raw paper after said setting step.

4. A method according to claim 3, wherein a surface of said raw paper, which is closely contacted with said absorbing member, is smoothed.

5. A method according to claim 1, wherein said setting step is performed at a temperature in a range of 10° C. to 50° C. lower than a setting temperature of said binder.

6. A method according to claim 1, wherein said setting step is performed in a period shorter than a time necessary to completely set said binder.

7. A method according to claim 1, further comprising the step of: squeezing said raw paper to remove the excess binder before said removing step.

8. A method according to claim 1, wherein said sucking means is an absorbing member which closely contacts a surface of said raw paper to absorb and remove the excess binder in said raw paper.

9. A method according to claim 8, wherein said setting step is performed at a temperature in a range of 10° C. to 50° C. lower than a setting temperature of said binder.

10. A method according to claim 8, wherein said setting step is performed in a period shorter than a time necessary to completely set said binder.

11. A method according to claim 1, further comprising the step of: bonding said smoothed raw paper to a core plate to form a friction material.

12. A method according to claim 11, wherein said bonding step is performed simultaneously with said smoothing step.

13. A method for manufacturing a wet friction material comprising the steps of:

impregnating a raw paper comprising a fibrous material, a filler and a friction adjustment material with a binder;

preventing formation of excessive coating of binder from being formed in an outermost surface layer during said impregnating step by contacting said raw paper with a material;

drying said binder in said raw paper;

setting said binder in said raw paper; and smoothing at least one surface of said raw paper.

14. A method according to claim 13, wherein said material is a sheet, and said preventing step further comprises the steps of:

laminating the sheet on a surface of said raw paper before said impregnating step; and detaching said sheet from said raw paper after the completion of said setting step;

wherein said sheet is closely contacted with the surface of said raw paper during said drying and setting steps.

15. A method according to claim 14, wherein said setting step is performed at a temperature in a range of 10° C. to 50° C. lower than a setting temperature of said binder.

16. A method according to claim 14, wherein said setting step is performed in a period shorter than a time necessary to completely set said binder.

17. A method according to claim 13, wherein said material is another raw paper, and said preventing step further comprises the steps of:

laminating said raw papers before said impregnating step; and detaching said raw papers from each other after the completion of said setting step;

wherein respective surface of said raw papers contacting each other are smoothed.

18. A method according to claim 13, further comprising cutting said raw paper into pieces of sheets or products before said impregnating step.

19. A method according to claim 18, wherein said setting step is performed at a temperature in a range of 10° C. to 50° C. lower than a setting temperature of said binder.

20. A method according to claim 18, wherein said setting step is performed in a period shorter than a time necessary to completely set said binder.

21. A method according to claim 17, wherein said setting step is performed at a temperature in a range of 10° C. to 50° C. lower than a setting temperature of said binder.

22. A method according to claim 17, wherein said setting step is performed in a period shorter than a time necessary to completely set said binder.

23. A method according to claim 13, further comprising the step of bonding said smoothed raw paper to a core plate to form a friction material.

24. A method according to claim 23, wherein said bonding step is performed simultaneously with said smoothing step.

25. A method according to claim 13, wherein said setting step is performed at a temperature in a range of 10° C. to 50° C. lower than a setting temperature of said binder.

26. A method according to claim 13, wherein said setting step is performed in a period shorter than a time necessary to completely set said binder.

* * * * *